Sept. 14, 1926.

C. F. BALL 1,599,739

POWER OPERATED WINCH FOR TRACTORS

Filed July 12, 1920

INVENTOR.
CHARLES F. BALL.
BY Chas. E. Townsend
ATTORNEY

Patented Sept. 14, 1926.

1,599,739

UNITED STATES PATENT OFFICE.

CHARLES F. BALL, OF PEORIA, ILLINOIS, ASSIGNOR, BY MESNE ASSIGNMENTS, TO CATERPILLAR TRACTOR CO., A CORPORATION OF CALIFORNIA.

POWER-OPERATED WINCH FOR TRACTORS.

Application filed July 12, 1920. Serial No. 395,566.

This invention relates to power operated winches for tractors and similar vehicles.

Of late years the use of tractors in construction work, including road building, well drilling, and the like has created an increasing demand for a winch or hoisting drum which may be put to a variety of purposes, and therefore it becomes necessary for the tractor manufacturer to supply a self-contained unit which can be applied to the tractor and which is susceptible of many different variations in respect to the speed. The object of the present invention is to provide a strong rugged detachable unit of this character which will afford a maximum variation in speed so as to be adaptable to any and all purposes and which may be readily and easily controlled.

Figures 1, 2:
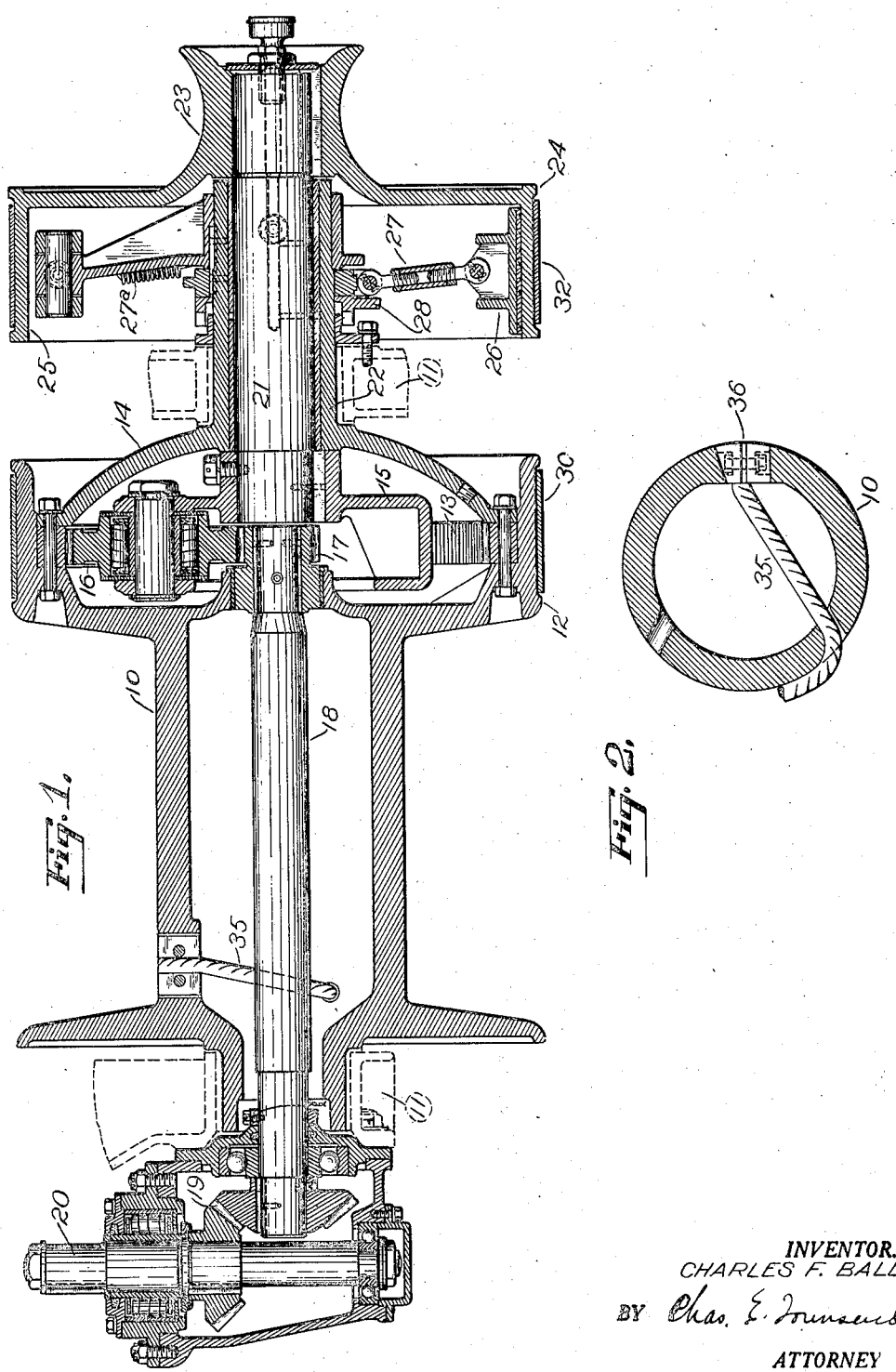
Fig. 1 shows a longitudinal central sectional view of the winch and connected parts.
Fig. 2 shows a cross-section of one of the winding drums of the winch.

The invention in its present form comprises a winding drum 10 extending transversely of the tractor and journaled in bearings 11. This drum at one end has an annular flange 12 on the inside of which is mounted a ring gear 13 formed with internal teeth. A front cover plate 14 bolts on to the annular flange and encloses a planetary gear mechanism which includes a spider or revoluble member 15 carrying a set of planet gears 16 in mesh with the internal gear 13. A sun gear 17 meshes with the planet gears and is mounted on shaft 18 which extends loosely through the winding drum 10 and has a bevel gear connection 19 at the opposite end with a driving shaft 20.

The spider 15 is fixed upon a shaft 21 journaled within a sleeve or hub 22 formed on the coverplate 14. The outer end of the shaft 21 carries a pulley 23 and formed integrally with the said pulley is a brake drum 24. The brake drum 24 is formed within with a friction face 25 to co-operate with an expanding clutch 26, the latter having toggle links 27 connected to a collar 28 slidably mounted on the sleeve 22 and held in disengaged position by means of a spring 27ª. The sliding collar 28 has an operating connection in the form of a lever 29 whereby to thrust said friction clutch 26 into operative engagement with the friction face 25.

The annular flange 12 on the winding drum 10 is formed on its periphery to receive a brake band 30, which band is controlled by a suitable operating lever (not shown). The said brake drum 24 receives a band 32, which band is controlled by a suitable lever.

The winding drum 10 has its rope 35 anchored thereon as shown at 36 in Fig. 1. In the operation of the drum, power to drive the same is transmitted through the jointed shaft 20, shaft 18, and the planetary gear mechanism previously described. A variety of different speeds in the operation of the drum is afforded by the planetary gear mechanism, the lowest speed being attained by allowing the spider 15 to rotate freely. A higher speed is provided when the spider 15 is held stationary or retarded somewhat by applying the brake band to the drum 24. A reverse drive is derived by moving the expanding clutch 26 into engagement with the friction face 25 whereupon the spider 15 and internal gear 13 will revolve as a unit.

The pulley 23 which is also used for hoisting or pulling purposes has not the same range of speed as the winding drum 10. A reduced speed is accomplished by clutching the friction device 26 against the friction face 25 and allowing the internal gear 13 to be carried around with the spider at the same speed. An increased speed is derived by disengaging the friction devices and transmitting motion to the pulley through the shaft 21 with the internal gear 13 held against movement or retarded by application of the brake-band to the drum 12.

Various changes in the construction and arrangement of the several parts herein shown and described may be employed without departing from the spirit of my invention as disclosed in the appended claims.

Having thus described my invention, what I claim and desire to secure by Letters Patent is:

1. A winch comprising a winding drum and driving mechanism therefor, said driving mechanism including a planetary gear set comprising a driven gear fixed to the drum, a set of planet gears meshing therewith, a revoluble support for said planet gears, a driving gear in mesh with said planet gears, a pulley connected directly to, and rotatable with, the revoluble supporting member, means to control the operation of the revoluble support to vary the speed of the drum, means to control the operation of the drum to vary the speed of the pulley, and means for connecting the drum and pulley together for joint rotation whereby to reverse the direction of rotation of the drum.

2. A winch comprising a winding drum and driving mechanism therefor, said driving mechanism including a planetary gear set comprising a driven gear fixed to the drum, a set of planet gears meshing therewith, a revoluble support for said planet gears, a driving gear in mesh with said planet gears, a pulley connected directly to, and rotatable with, the revoluble supporting member, and a brake mechanism for varying the rotation of the driven gear whereby to vary the speed of operation of the pulley and means for connecting the revoluble support to the driven gear for joint rotation, whereby to reverse the direction of rotation of the drum.

3. A winch comprising a drum, a shaft extending through the same, a driving gear fixed on the shaft, an annular flange formed on one end of the drum, a controllable brake-band on said flange, an internal gear fixed within said flange, a cover-plate on the flange, a brake-drum and pulley carried loosely on the hub of the cover-plate, a controllable brake-band on said brake-drum, a set of planet gears meshing with the driving gear and internal gear, a revoluble supporting member for the planet gears, a shaft journaled in the hub of the cover-plate, and connecting with the pulley and with the revoluble supporting member, and a controllable friction clutch carried on the hub of the cover-plate and co-operating with a friction face on the inside of the brake-drum as and for the purpose stated.

In testimony whereof I have hereunto set my hand.

CHARLES F. BALL.